(12) United States Patent
Zischka et al.

(10) Patent No.: US 10,040,614 B2
(45) Date of Patent: Aug. 7, 2018

(54) METHOD FOR PRODUCING A COATED PACKAGING MATERIAL, AND PACKAGING MATERIAL HAVING AT LEAST ONE BARRIER LAYER FOR HYDROPHOBIC COMPOUNDS

(75) Inventors: Michael Zischka, Stattegg-Muhl (AT); Julia Spanring, Graz (AT); Martin Reischl, Stallhofen (AT)

(73) Assignee: MAYR-MELNHOF KARTON AG, Vienna (AT)

( * ) Notice: Subject to any disclaimer, the term of this patent is extended or adjusted under 35 U.S.C. 154(b) by 529 days.

(21) Appl. No.: 14/124,316

(22) PCT Filed: Jun. 8, 2012

(86) PCT No.: PCT/EP2012/060902
§ 371 (c)(1),
(2), (4) Date: Dec. 6, 2013

(87) PCT Pub. No.: WO2012/168433
PCT Pub. Date: Dec. 13, 2012

(65) Prior Publication Data
US 2014/0113152 A1    Apr. 24, 2014

(30) Foreign Application Priority Data
Jun. 10, 2011    (EP) .................... 11169454

(51) Int. Cl.
*B65D 65/42* (2006.01)
*C09D 129/04* (2006.01)
*D21H 19/82* (2006.01)

(52) U.S. Cl.
CPC ........... *B65D 65/42* (2013.01); *C09D 129/04* (2013.01); *D21H 19/82* (2013.01); *Y10T 428/3188* (2015.04)

(58) Field of Classification Search
CPC ....... B65D 65/42; C09D 129/04; D21H 19/82
See application file for complete search history.

(56) References Cited

U.S. PATENT DOCUMENTS 5,989,724 A   11/1999  Wittosch et al.
6,444,750 B1 * 9/2002  Touhsaent ............... B32B 27/00
                                                        427/316

(Continued)

FOREIGN PATENT DOCUMENTS

CL       14152004       4/2005
CL       005882009      5/2010

(Continued)

OTHER PUBLICATIONS

J.M. Gohil, A. Bhattacharya, and P. Ray. Studies on the Cross-linking of Poly(vinyl Alcohol). 2006. Journal of Polymer Research. 13. 161-169.*

(Continued)

*Primary Examiner* — Dah-Wei D. Yuan
*Assistant Examiner* — Kristen A Dagenais
(74) *Attorney, Agent, or Firm* — Barlow, Josephs & Holmes, Ltd.

(57) ABSTRACT

The invention relates to a method for producing a coated packaging material (10), wherein at least the following steps are carried out: a) providing a substrate (12), which has a base material (14) made of cellulose, an outside (16) to face away from a good to be packaged, and an inside (18) to face the good to be packaged; b) coating the inside (18) of the substrate with at least one layer of an aqueous composition, which comprises at least polyvinyl alcohol and a cross-linking agent and has a solid content of at most 25 wt %; and c) drying the layer and cross-linking the polyvinyl alcohol by means of the cross-linking agent in order to form a barrier layer (22a, 22b) for hydrophobic compounds. The invention (Continued)

further relates to a packaging material (10) having at least one barrier layer (22*a*, 22*b*) for hydrophobic compounds.

19 Claims, 1 Drawing Sheet

(56) References Cited

U.S. PATENT DOCUMENTS

| | | | |
|---|---|---|---|
| 6,852,422 B2* | 2/2005 | Kendall | B32B 29/00 |
| | | | 428/32.18 |
| 2003/0188839 A1* | 10/2003 | Urscheler | D21H 19/82 |
| | | | 162/123 |
| 2009/0220717 A1* | 9/2009 | Wilczak | B65D 1/0215 |
| | | | 428/36.6 |
| 2010/0112226 A1 | 5/2010 | Weilbacher | |
| 2011/0159308 A1* | 6/2011 | Brondsema | C09D 129/04 |
| | | | 428/500 |

FOREIGN PATENT DOCUMENTS

| | | |
|---|---|---|
| CL | 008532013 | 4/2012 |
| DE | 69532378 T2 | 1/2004 |
| DE | 102005056574 A1 | 5/2007 |
| EP | 0718437 A1 | 6/1996 |
| EP | 1884594 A1 | 2/2008 |
| JP | 07205376 | 8/1995 |
| JP | 10502882 | 3/1998 |
| RU | 2211177 C2 | 8/2003 |
| RU | 2236943 C2 | 9/2004 |
| RU | 2436882 C2 | 12/2011 |
| WO | 9601736 A1 | 1/1996 |

OTHER PUBLICATIONS

J.M. Gohil, A. Bhattacharya, and P. Ray. Studies on the Cross-linking of Poly(vinyl Alcohol). 2006. Journal of Polymer Research. 13. 161-169. (Year: 2006).*

Korean Patent Office Examination Report corresponding to Korean Patent Appl. 10-2014-7000224 with Translation.

JP Family Table 10-502882.

JP Family Table 07-205376.

Ushakov S.N., "Polyvinyl alcohol and derivatives thereof," vol. I, M.L., Ed. AN USSR 1960, p. 323-328.

"Chemistry and technology of synthetic high-molecular compounds." Carbochain polymers. M, Science, 1967, p. 573-575.

* cited by examiner

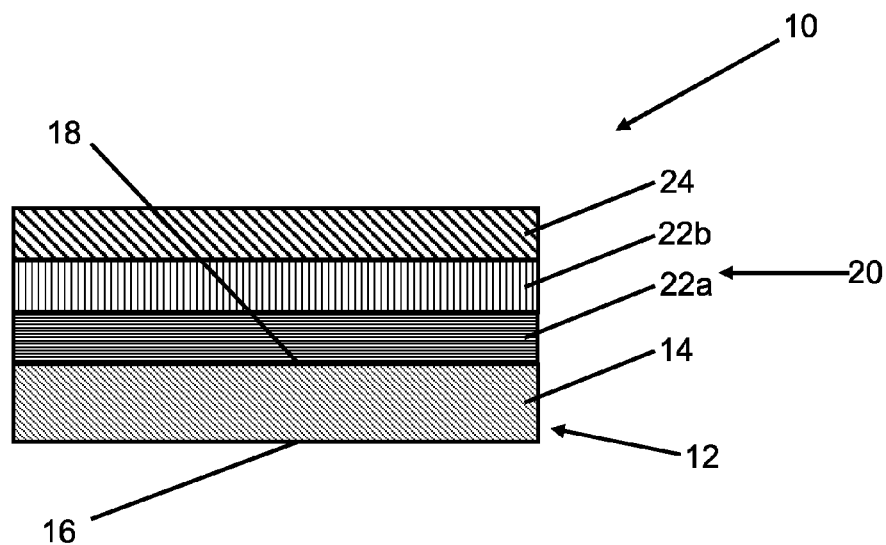

METHOD FOR PRODUCING A COATED PACKAGING MATERIAL, AND PACKAGING MATERIAL HAVING AT LEAST ONE BARRIER LAYER FOR HYDROPHOBIC COMPOUNDS

BACKGROUND OF THE INVENTION

The invention relates to a method for producing a coated packaging material as well as to a packaging material with at least one barrier layer for hydrophobic compounds.

A problem recently having become known in packagings based on cellulose is the transition (migration) of mineral oil components from the packaging material into the packaging good. With packaging materials based on cellulose, therein, the mineral oil components are predominantly derived from newspaper and packaging printing colors of recycling material based on waste paper, which is used in continuously increasing amount in the packaging industry for ecological reasons. The mineral oil components present in the recycling material possibly can build up in the packaging good, which is stored in the packaging material without additional outer packaging.

From the prior art, various packaging materials with barrier layers against hydrophobic components are known. For example, DE 695 32 378 T2 discloses a cellulose fiber fabric having a layer as the barrier layer, which has a continuous arrangement of randomly oriented cellulose fibers as well as a layer including cyclodextrin, wherein the layer including cyclodextrin in turn functions as a barrier layer or trap with respect to the passage of permeating hydrophobic compounds—such as for example mineral oils, aromatic hydrocarbons, printing colors and the like.

The circumstance is to be considered as disadvantageous in the known packaging material that it is comparatively costly and expensive in production.

It is the object of the invention to provide a method being able to be performed simpler and more inexpensively for producing a packaging material based on cellulose with a barrier layer for hydrophobic compounds. A further object of the invention is to provide a packaging material based on cellulose being able to be produced simpler and more inexpensively with a barrier layer for hydrophobic compounds.

BRIEF SUMMARY OF THE INVENTION

According to the invention, these objects are solved by a method for producing a coated packaging material as well as by a packaging material. Advantageous configurations with convenient developments of the invention are specified in the respective dependent claims, wherein advantageous configurations of the method are to be considered as advantageous configurations of the packaging material and vice versa.

A method according to the invention for producing a coated packaging material includes at least the steps of: a) providing a substrate, which has a base material of cellulose, an outside to face away from a packaging good as well as an inside to face the packaging good, b) coating the inside of the substrate with at least one layer of an aqueous composition including at least polyvinyl alcohol and a cross-linking agent and having a solid content of at most 25% by wt., and c) drying the layer and cross-linking the polyvinyl alcohol with the aid of the cross-linking agent with formation of a barrier layer for hydrophobic compounds. Therein, within the scope of the present invention, a material is understood by a base material of cellulose, which is at least predominantly, that is at least 51%, in particular at least 75% and preferably at least 90% made of cellulose, wherein percentage indications are basically to be understood as percent by weight within the scope of the present invention, unless anything to the contrary is stated. The base material can basically be uncoated or already provided with one or more layers, wherein at least on the inside uncoated base material is preferred. For example, the base material can be coated or uncoated paper, coated or uncoated cardboard or coated or uncoated paperboard. Within the scope of the invention, a thermoplastic plastic is understood by polyvinyl alcohol, which is composed at least predominantly of head-head and/or head-tail linked monomers of the general formula

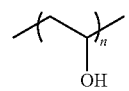

Polyvinyl alcohols usable within the scope of the invention are for example accessible by the inherently known hydrolysis of polyvinyl esters, in particular of polyvinyl acetate. Usual trade names of polyvinyl alcohols suitable for performing the invention are for example Elvanol, Gohsenol, Polyviol, Poval or Mowiol. Within the scope of the invention, compounds are understood by a cross-linking agent, which contribute to the formation of a three-dimensional network by reaction with polyvinyl alcohol. Basically, a single chemical compound or a mixture of different chemical compounds can be used as the cross-linking agent. Suitable cross-linking agents in particular include bi-, tri- or multi-functional compounds, which are able to react with the hydroxy groups of the polyvinyl alcohol. The aqueous composition, which can be referred to as a streak or coating color, can basically be formed free of fillers and/or pigments or alternatively include fillers and/or pigments. However, it is to be emphasized that the overall solid content of the aqueous composition including possibly present fillers/pigments is always below 25% by wt. since the aqueous composition hereby can be used as a low-viscosity coating color, which allows particularly high application speeds with low production cost at the same time. For applying the aqueous composition, for example, inherently known contour coating methods can be used, wherein the invention is basically not restricted with respect to the application methods to be used in step b). In contrast to the prior art, the method according to the invention can be particularly simply and inexpensively performed since only inexpensive starting materials are required and can be fast and simply processed with the aid of usual manufacturing plants.

By cross-linking the polyvinyl alcohol, a barrier layer is generated on the inside of the packaging material, which functions as a barrier and/or trap with respect to hydrophobic compounds and completely or at least nearly completely inhibits a migration of these hydrophobic compounds from the outside of the packaging material and/or from the base material into the interior of the packaging. The barrier layer is humidity-resistant due to the cross-linking of the polyvinyl alcohol, whereby the barrier effect can be advantageously maintained over the entire lifetime of a packaging produced from the packaging material according to the invention. Moreover, the packaging material produced according to the invention is degradable both in aerobic and anaerobic manner since both the cellulose base material and the coating have a hydrophilic surface, which are thereby accessible to bacterial decomposition. By forming the barrier layer on the inside of the packaging material, the barrier layer is additionally particularly reliably protected from mechanical damage in transport or during storage of a packaging formed from the packaging material according to the invention. The packaging material produced via the method according to the invention additionally ensures for example the food safety of the packaging good due to its barrier effect with respect to hydrophobic compounds—such as mineral oil components of recycling material or mineral oil compounds of imprints. At the same time, it obtains the ecological advantages of a packaging industry based on waste paper and ensures the recycling capability of the coated base material.

In an advantageous development of the invention, it is provided that a base material with an area-related mass between 5 g/m² and 2000 g/m², in particular between 100 g/m² and 1000 g/m² and preferably between 200 g/m² and 800 g/m² is used. Hereby, the packaging material can be particularly flexibly adapted to different application purposes. If the base material has an area-related mass between about 5 g/m² and about 150 g/m², it is referred to as a paper within the scope of the invention. A base material with an area-related mass between about 150 g/m² and 800 g/m² is referred to as cardboard within the scope of the invention, while a base material with an area-related mass between about 800 g/m² and 2000 g/m² is referred to as paperboard.

Further advantages arise if a polyvinyl alcohol with a degree of hydrolysis between 75% and 100%, in particular between 80% and 99.9%, and/or a degree of polymerization between 500 and 3000 is used. Within the scope of the invention, degrees of hydrolysis of 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% as well as corresponding intermediate values are understood by a degree of hydrolysis between 75% and 100%. Within the scope of the invention, degrees of polymerization between 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950 or 3000 as well as corresponding intermediate values are understood by a degree of polymerization between 500 and 3000. Basically, for producing a barrier layer, a mixture of polyvinyl alcohols with different degrees of hydrolysis and/or polymerization can also be used. The chemical and physical properties of the barrier layer can be exactly adapted to the respective application purpose of the packaging material as well as to the application method used for applying the aqueous composition via the degree of hydrolysis and degree of polymerization. By the variation of the degree of hydrolysis and/or the degree of polymerization, for example, the porosity, the solubility and the crystallinity of the layer can be adjusted according to the requirement of the application. Thereby, in particular the flexibility and extensibility of the resulting barrier layer can be optimally adapted to the respective requirements.

In further advantageous development of the invention, the aqueous composition has a solid content of at most 15% by wt. if it is formed free of fillers and/or pigments. In particular, the aqueous composition has a solid content of 15%, 14%, 13%, 12%, 11%, 10%, 9%, 8%, 7%, 6%, 5%, 4%, 3%, 2% or 1%, if it is formed free of fillers and/or pigments. Hereby, a particularly low viscosity is achieved, which allows correspondingly high application speeds. Alternatively, it is provided that the aqueous composition has a solid content of at most 25% by wt. if it includes fillers and/or pigments. Hereby, high application speed is further allowed, wherein additional properties of the packaging material are adjustable with the aid of the fillers and/or pigments. For example, the transparency, color, surface quality or raw density of the streak can be specifically varied with the aid of fillers and/or pigments.

Further advantages arise by using an aqueous composition with a solid content between 3% by wt. and 25% by wt., in particular between 10% by wt. and 22% by wt. In particular, solid contents of 3% by wt., 4% by wt., 5% by wt., 6% by wt., 7% by wt., 8% by wt., 9% by wt., 10% by wt., 11% by wt., 12% by wt., 13% by wt., 14% by wt., 15% by wt., 16% by wt., 17% by wt., 18% by wt., 19% by wt., 20% by wt., 21% by wt., 22% by wt., 23% by wt., 24% by wt. or 25% by wt. as well as corresponding intermediate values are to be understood by a solid content between 3% by wt. and 25% by wt. In that the aqueous composition has a solid content between 3% by wt. and 25% by wt, in particular between 10% by wt. and 22% by wt., low-viscosity coating colors can be produced, which are particularly well suited for the application with contour coating methods with high application speeds. Furthermore, by adjusting the solid content, the reaction speed of the cross-linking can be advantageously controlled. Depending on the used cross-linking agent(s) as well as depending on the selected solid content, the cross-linking of the polyvinyl alcohol can already be performed during drying. Alternatively or additionally, the cross-linking of the polyvinyl alcohol can be effected subsequent to drying.

Alternatively or additionally, it has proven advantageous if an aqueous composition with a water content of at least 75% by wt. in particular of at least 80% by wt. is used. In particular, water contents of 75% by wt., 76% by wt., 77% by wt., 78% by wt., 79% by wt., 80% by wt., 81% by wt., 82% by wt., 83% by wt., 84% by wt., 85% by wt., 86% by wt., 87% by wt., 88% by wt., 89% by wt., 90% by wt., 91% by wt., 92% by wt., 93% by wt., 94% by wt., 95% by wt., 96% by wt., 97% by wt., 98% by wt. or 99% by wt. as well as corresponding intermediate values are to be understood by a water content of at least 75% by wt. By adjusting the solid content and/or the water content to the above mentioned values, coating colors can be produced, the viscosities of which are optimally matched to the used application method. Additionally, thereby, particularly well stabilized solutions can be produced, which have the storage stability required for the application. Similarly, hereby, the reaction speed of the cross-linking of the polyvinyl alcohol can be controlled.

In a further advantageous development of the invention, it is provided that at least one olefinically saturated and/or unsaturated compound with at least one functional group selected from aldehyde, carboxylic acid, acid anhydride and amino group, and/or ferric chloride and/or an alkyl orthosilicate, in particular tetraethyl orthosilicate, and/or an urea formaldehyde resin is used as cross-linking agent. Hereby, the chemical and physical properties of the barrier layer can be particularly exactly adapted to the application purpose of the packaging material as well as to the respective coating and drying method. Suitable olefinically saturated and/or unsaturated cross-linking agents are for example glyoxal, glutaraldehyde, acryl aldehyde, malonic acid, glutaric acid, adipic acid, citric acid, butane tetracarboxylic acid, acrylic acid, polyacrylic acid, methacrylic acid, maleic acid, methacryl methylester or hydroxyl ethyl methacrylate as well as any mixtures hereof as well as polymerizates and/or copolymerizates thereof. For example, polyacrylic acid and/or polymethacrylic acid (below summarized by the term "poly(meth)acrylic acid") can be used as the cross-linking agent, the acid groups of which can be esterified with the alcohol groups of the polyvinyl alcohol. Of course, other polyacrylic acids such as for example polyethyl acrylic acid can basically also be used.

Alternatively or additionally, ferric chloride ($FeCl_3$), tetraethyl orthosilicate and/or a urea formaldehyde resin can be used as the cross-linking agent. The use of ferric chloride offers advantages in particular in producing packaging material for foodstuff since the aqueous composition can be formed free of compounds such as for example chromates or the like undesired in the food area. Preferably, the urea formaldehyde resin is based on water in order to ensure good miscibility in the aqueous composition. Such inherently known urea formaldehyde resins are for example available under the trade name Urecoll.

Further advantages arise by using an aqueous composition including between 0.01 and 55 parts by weight of cross-linking agent related to 100 parts by weight of polyvinyl alcohol and/or including between 1 and 60 parts by weight of a filler and/or a pigment related to 100 parts by weight of polyvinyl alcohol. In particular, parts by weight of 0.01, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 as well as corresponding intermediate values are to be understood by a weight proportion between 0.01 and 60. In that the weight proportion of the cross-linking agent is in the mentioned range between 0.01 and 55 parts by weight, the cross-linking level of the polyvinyl alcohol and thereby the elasticity and barrier property of the barrier layer can be optimally adapted to the respective application purpose. As fillers and/or pigments, basically, organic, inorganic as well as organic-inorganic modified particles are suitable, which are equipped with or without swelling power in water. The use of a filler and/or pigment allows adaptation of the optical impression of the packaging material as well as better printability among other things. Moreover, suitable fillers and/or pigments form an additional "mechanical" barrier against the passage of hydrophobic compounds. The barrier effect of the barrier layer can therefore be advantageously increased by the addition of fillers and/or pigments. In particular kaolin, sheet silicates such as montmorillonite, bentonite, vermiculite, laponite, hectorite, saponite as well as silica and alumino-silicates are suitable as inorganic fillers. As organic fillers, celluloses—for example in the form of fibers or as micro- or nanofibrilled cellulose—as well as other polysaccharides—for example chitosan, cellulose derivatives, hemicelluloses or modified/unmodified starch—can be employed. A physical cross-linking based on hydrogen bridge bonds with the polyvinyl alcohol is also achieved by employment of fillers and pigments, which have and/or can form OH groups on the surface in the aqueous medium.

Further advantages arise if a filler and/or a pigment are used, which are acid-stable and/or have at least substantially spherical and/or platelet-shaped particle geometries. Therein, acid-stable fillers and/or pigments are in particular advantageous if the polyvinyl alcohol is cross-linked in the acidic medium. In particular, it is preferred in this case if the aqueous composition is free of acid-labile compounds such as for example starch or the like. By spherical and/or platelet-shaped particle geometries, a particularly high barrier effect can be achieved since the path to be traveled of the hydrophobic compounds is considerably extended by the labyrinth-like arrangement of the fillers and/or pigments in the barrier layer.

A further advantageous development of the invention is constituted by the addition of surfactants, rheology adjuvants and/or defoamers to the aqueous composition. This ensures the optimum processability of the coating color by means of contour coating methods. Suitable surfactants for lowering the surface tension of the aqueous composition are for example commercially available under the trade names Envirogem (Air Products).

In a further advantageous development of the invention, it is provided that a pH value of the aqueous composition is adjusted to a value between 1 and 7, in particular between 1.5 and 3.5 before applying to the substrate and/or that the aqueous composition is degassed before applying to the substrate. By adjusting the pH value of the aqueous composition to a value of 1.0, 1.5, 2.0, 2.5, 3.0, 3.5, 4.0, 4.5, 5.0, 5.5, 6.0, 6.5 or 7.0 or to a corresponding intermediate value, the cross-linking speed of the polyvinyl alcohol can be specifically varied. Hereby, the method can be optimally adapted to the properties of the used base material, to the respectively used application method of the aqueous composition as well as to the used drying method. By degassing the aqueous composition, a possible bubble formation in the barrier layer is reliably prevented and a consistently high barrier effect over the coated substrate surface is achieved.

Further advantages arise if an aqueous composition is used, which has a viscosity between 200 mPas and 1500 mPas. Hereby, the aqueous composition can be optimally adapted to the respectively used application method such that a continuous and uniform layer thickness can be achieved in any event. Therein, a low viscosity, in particular in the range between 200 mPas and 600 mPas, is in particular suitable for the following application methods: application by means of curtain coating methods, casting, spraying. In contrast, a higher viscosity, in particular in the range between 600 mPas and 1500 mPas, allows improved application by means of doctor blade, blade and/or film press. Upon use of curtain coating methods, it is preferred if multi-layer coating curtains are not used. Hereby, it is possible to simply capture excess aqueous composition and to use it for a new coating passage without undesired mixing of aqueous compositions of different composition being able to occur.

Further advantages arise if the aqueous composition is applied to the substrate such that an area-related dry mass between 1 $g/m^2$ and 20 $g/m^2$, in particular between 3 $g/m^2$ and 15 $g/m^2$ arises. Within the scope of the invention, in particular, area-related dry masses of 1 $g/m^2$, 2 $g/m^2$, 3 $g/m^2$, 4 $g/m^2$, 5 $g/m^2$, 6 $g/m^2$, 7 $g/m^2$, 8 $g/m^2$, 9 $g/m^2$, 10 $g/m^2$, 11 $g/m^2$, 12 $g/m^2$, 13 $g/m^2$, 14 $g/m^2$, 15 $g/m^2$, 16 $g/m^2$, 17 $g/m^2$, 18 $g/m^2$, 19 $g/m^2$ or 20 $g/m^2$ as well as corresponding intermediate values are to be understood by an area-related dry mass between 1 $g/m^2$ and 20 $g/m^2$. Hereby, the barrier effect of the barrier layer can be adapted to base materials or packaging situations differently loaded with hydrophobic compounds. For low loaded base materials or for packaging material, which will presumably be exposed to low amounts of hydrophobic compounds, correspondingly lower application amounts are sufficient. In reverse, larger application amounts can be used to correspondingly increase the barrier effect of the barrier layer. Besides, the application amount can be varied depending on the used application method in order to generate a uniform barrier layer with a sufficiently high barrier effect. Due to the cross-linking of the polyvinyl alcohol, therein, basically, considerably lower application amounts are sufficient in contrast to the prior art in order to achieve a sufficient barrier effect. Hereby, in particular with a bulk article such as packaging material, considerable cost savings result. Moreover, in contrast to the prior art, it is basically not required to form complex multi-layer layer systems on the surface of the substrate in order to ensure a sufficient barrier effect.

Alternatively or additionally, it can be provided that the aqueous composition is applied to the substrate such that the layer has a wet film thickness between 1 μm and 1000 μm, in particular between 10 μm and 200 μm. Hereby, the aqueous composition can be uniformly applied and correspondingly uniformly dried in particular depending on the water absorption capacity of the respective base material. Moreover, unnecessary losses of aqueous composition during coating are avoided such that the barrier layer can be produced particularly economically and with a consistently high quality in this manner.

In a further advantageous development of the invention, it is provided that the aqueous composition is applied to the substrate by means of an equalizing coating method, in particular by means of doctor blade, blade and/or film press, and/or by means of a contour coating method, in particular by means of casting, spraying, curtain coating and/or airbrush. The use of an equalizing coating method allows material smoothing and is particularly convenient insofar as optionally subsequent contactless application methods largely maintain the contour of the surface of the substrate. This means that a rough surface contour of the base material or of the substrate is compensated for and thereby smoothed with the aid of an equalizing coating method. Usually, higher product quality is achieved the smoother the material web is. In this context, is has turned out that it is more advantageous for the most applications to first smooth the substrate and then to attach the barrier layer than to smooth a rough contour of the barrier layer afterwards. By the use of equalizing or leveling coating methods, in summary, a smooth surface can be generated on rough substrates. This smooth surface is then particularly suited for a subsequent application of contour coating methods.

The use of contour coating methods offers the basic advantage that pressure is not exerted at the junction between base material and aqueous composition such that deep penetration of the aqueous composition in the base material is avoided. Hereby, particularly uniform barrier layers can be produced. At the same time, particularly low application amounts of aqueous composition are required to achieve a desired barrier layer effect, whereby the method can be particularly economically performed.

Further advantages arise if the coated substrate is dried to a residual humidity between 3% and 10%, in particular between 5% and 7%, in the base material in step c). By a residual humidity in the range of 3%, 4%, 5%, 6%, 7%, 8%, 9% or 10%, it is ensured that the packaging material has optimum mechanical properties and can be further processed to a packaging without damage.

In a further advantageous development of the invention, it is provided that the coated substrate is dried by means of infrared irradiation and/or convection and/or under UV irradiation in step c). Hereby, the drying of the applied layer and the cross-linking of the polyvinyl alcohol can be optimally controlled depending on the used cross-linking agent and moreover the desired residual humidity content can be precisely adjusted. Therein, the irradiation with UV light can be performed alternatively or additionally to infrared irradiation and/or convection and is advantageous in particular in use of ferric chloride ($FeCl_3$) as the cross-linking agent to initiate the cross-linking reaction.

In further development of the invention, in step a), a substrate is provided, which includes a base material, the outside and/or inside of which is provided with a conditioning layer and/or a covering layer. In other words, it is provided that the base material to be coated with the aqueous composition in step b) is already provided with a layer, on which the barrier layer of cross-linked polyvinyl alcohol is generated. The conditioning layer and/or the covering layer can for example be a layer including polyvinyl alcohol, which is preferably filled with spherical or platelet-shaped pigments. Herein, it is advantageous that the conditioning streak already has barrier properties with respect to hydrophobic substances and is additionally protected from damage by the barrier layer generated on the conditioning streak with cross-linked polyvinyl alcohol.

Further advantages arise if the conditioning layer and/or the covering layer include non-cross-linked polyvinyl alcohol and/or are composed of non-cross-linked polyvinyl alcohol. In particular, it can be provided that the conditioning layer and/or the covering layer are formed free of cross-linked polyvinyl alcohol, whereby it is not excluded hereby that the conditioning layer and/or the covering layer optionally include further components such as for example fillers and/or pigments besides non-cross-linked polyvinyl alcohol. Hereby, the elasticity and flexibility of the packaging material can be advantageously increased. Moreover, in this manner, it is ensured that the barrier layer generated in the further method progress on the conditioning layer and/or covering layer is not damaged in further processing the packaging material—for example in stamping, cutting or bonding—and its barrier effect is maintained. In addition, in that the conditioning layer and/or the covering layer include non-cross-linked polyvinyl alcohol or are completely composed of non-cross-linked polyvinyl alcohol or are free of cross-linked polyvinyl alcohol, the barrier effect of the barrier layer with respect to hydrophobic compounds is additionally improved without having to accept restrictions with regard to the biological degradability of the packaging material.

In a further development of the invention, it is provided that the steps b) and c) are repeated at least once and/or at most three times. Hereby, a layer system of two, three or four barrier layers can be formed on the inside of the base material, whereby a particularly high barrier effect is achieved. For example, this is advantageous in packagings, which are transported over sea or which are exposed to different climatic conditions over longer time. Therein, the barrier layers can basically be formed identically or differently. If the steps b) and c) are performed multiple times one after the other, excess aqueous composition can simply be captured and be reused for a new method run, whereby the process costs are considerably reduced.

Further advantages arise if the substrate is coated with a further composition before step a) and/or after step c), wherein the further composition includes at least polyvinyl alcohol, has a solid content of at most 25% by wt. and is free of cross-linking agents. In this manner, a base and/or covering layer of non-cross-linked polyvinyl alcohol can be produced, whereby the layer system formed on the base material of the substrate has improved flexibility and extensibility. In that the further composition has a solid content of at most 15% by wt., if it is produced free of additives such as fillers and/or pigments, or if the further composition has an overall solid content of at most 25% by wt., if it is provided with fillers and/or pigments, the viscosity of the further composition can be optimally matched to the respectively used application method. In addition, thereby, the storage stability of the aqueous composition is improved.

In a further development of the invention, it is provided that the substrate is dried after coating with the further composition. Hereby, the barrier layer and/or the base material are prevented from undesirably swelling by water absorption.

A further aspect of the invention relates to a packaging material, including a substrate having a base material of cellulose, an outside to face away from a packaging good as well as an inside to face the packaging good, as well as a layer system disposed on the inside of the substrate with at least one barrier layer for hydrophobic compounds, wherein the barrier layer includes cross-linked polyvinyl alcohol. The packaging material according to the invention has an excellent barrier effect with respect to hydrophobic compounds with high humidity resistance at the same time and can be particularly simply and inexpensively produced in contrast to the prior art since only inexpensive starting materials are required and can be fast and simply processed with the aid of usual manufacturing plants. The packaging material according to the invention additionally ensures the food safety of the packaging good due to its barrier effect with respect to hydrophobic compounds—such as mineral oil components of recycling material or from imprints. At the same time, it obtains the ecological advantages of a packaging industry based on waste paper. The further arising advantages can be extracted from the previous descriptions, wherein advantageous developments of the method are to be considered as advantageous developments of the packaging material and vice versa.

Further advantages arise if the barrier layer is at least predominantly composed of cross-linked polyvinyl alcohol. In other words, it is provided that the barrier layer is formed of cross-linked polyvinyl alcohol by 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100%. Hereby, in particular the flexibility, extensibility, barrier effect and printability of the barrier layer can be particularly simply adapted to the respective application purpose.

An additionally improved barrier effect is achieved in a further development of the invention in that the layer system includes at least two barrier layers of cross-linked polyvinyl alcohol.

A particularly specific barrier effect with respect to different hydrophobic compounds is achieved in a further advantageous development of the invention in that the at least two barrier layers include polyvinyl alcohols with different cross-linking levels and/or polyvinyl alcohols with different degrees of hydrolysis and/or polyvinyl alcohols cross-linked with different cross-linking agents.

In a further advantageous development of the invention, it is provided that the barrier layer including polyvinyl alcohol includes organic, inorganic and/or organic-inorganic modified particles, which have a spherical or platelet-shaped particle geometry. The use of such particles allows adaptation of the optical impression of the packaging material as well as better printability among other things. Moreover, suitable particles form an additional "mechanical" barrier against the passage of hydrophobic compounds. The barrier effect of the barrier layer can therefore be advantageously increased by the addition of these particles, which can function as a filler and/or pigments. Herein, kaolin, sheet silicates such as montmorillonite, bentonite, vermiculite, hectorite, saponite, laponite as well as silica and aluminosilicates or mixtures thereof in particular have proven advantageous.

Further, it has proven advantageous if the layer system includes at least one layer containing non-cross-linked polyvinyl alcohol. Preferably, this layer is formed free of cross-linked polyvinyl alcohol or without addition of cross-linking agents. Hereby, the flexibility and extensibility of the layer system is advantageously increased such that a possible damage to the barrier layer in further processing the packaging material according to the invention is particularly reliably prevented.

In a further advantageous development of the invention, it is provided that the layer containing non-cross-linked polyvinyl alcohol is disposed immediately on the inside of the substrate and/or between two barrier layers and/or on a side of the barrier layer facing away from the base material. In other words, it is provided that the layer containing non-cross-linked polyvinyl alcohol constitutes the base and/or the terminating covering layer with respect to the base material and/or is formed between two barrier layers containing cross-linked polyvinyl alcohol. This allows particularly good adaptation to different purposes of use of the packaging material and also increases the barrier effect with respect to hydrophobic compounds besides the flexibility and extensibility of the layer system.

In a further advantageous development of the invention, it is provided that the packaging material is obtainable by a method according to any one of the preceding embodiments. The features arising from it and the advantages thereof can be extracted from the preceding descriptions.

BRIEF DESCRIPTION OF THE DRAWINGS

Further features of the invention are apparent from the claims, the embodiments as well as based on the drawing. The features and feature combinations mentioned above in the description as well as the features and feature combinations mentioned below in the embodiments are usable not only in the respectively specified combination, but also in other combinations without departing from the scope of the invention. There shows:

FIG. 1 a schematic lateral sectional view of a packaging material according to the invention according to an embodiment.

DETAILED DESCRIPTION OF THE INVENTION

FIG. 1 shows a schematic lateral sectional view of a packaging material 10 according to the invention according to an embodiment. The packaging material includes a substrate 12 composed of a base material 14 and having an outside 16 to face away from a packaging good as well as an inside 18 to face the packaging good. The base material 14 is cardboard with an area-related mass of 400 g/m$^2$ in the present embodiment. On the inside 18 of the substrate 12, a layer system 20 is formed, which is produced by generating a first barrier layer 22a, a second barrier layer 22b as well as a layer 24 functioning as a covering layer. The barrier layers 22a, 22b include cross-linked polyvinyl alcohol. The barrier layer 22a moreover includes platelet-shaped or spherical particles or mixtures thereof as a filler and/or pigment. The barrier layers 22a, 22b make impossible or prevent thereby at least largely the migration of hydrophobic compounds through the layer system 20. Therein, the cross-linking of the polyvinyl alcohol described in more detail below ensures increased mechanical stability and prevents swelling of the barrier layers 22a, 22b if they come in contact with humidity.

As fillers and/or pigments, basically, organic, inorganic as well as organic-inorganic modified particles are suitable, which are equipped with or without swelling power in water. In the present embodiment, the barrier layer 22a includes kaolin. Therein, kaolin offers the advantage that it is acid-stable and does not swell in water. Moreover, the used kaolin is composed of platelet-shaped particles, which form a mechanical barrier and hereby additionally impede or make impossible the migration of compounds through the barrier layer 22a. In contrast, the second barrier layer 22b is composed exclusively of cross-linked polyvinyl alcohol, wherein polyvinyl alcohols with different degrees of hydrolysis and polymerization are used and have been cross-linked with different cross-linking agents for producing the two barrier layers 22a, 22b. However, of course, the two barrier layers 22a, 22b can basically also include the same cross-linked polyvinyl alcohol. In contrast, the terminating layer 24, which is in contact with the packaging good in a later packaging formed of the packaging material 10 is composed of non-cross-linked polyvinyl alcohol and in particular increases the flexibility and extensibility of the layer system 20. Alternatively or additionally, it can be provided that the layer 24 is immediately formed on the substrate 12 and/or between the barrier layers 22a, 22b.

The outside 16 of the substrate 12 is not coated in the shown embodiment. However, basically, one or more layers can also be provided on the outside 16 in order to achieve certain properties of the packaging material 10, for example a better printability or a gas and/or humidity barrier effect.

In the following, various embodiments for the production of the packaging material 10 according to the invention with barrier properties with respect to nonpolar chemical compounds are cited.

1. Production of an Aqueous Polyvinyl Alcohol Solution

If the polyvinyl alcohol is not already present dissolved in water, the production of the polyvinyl alcohol solution is performed as follows:

First, a defined amount of cold water is presented. Subsequently, a defined amount of an optionally finely ground polyvinyl alcohol powder with a degree of hydrolysis, which is preferably between 80% and 99.9%, is stirred in with vigorous stirring (2000 rpm) at a temperature of 75° C. to 80° C. within 30 to 45 minutes with an intensive or dissolver stirrer. The dissolution process is terminated as soon as the solution is clear. The still warm solution is cooled to 25° C. Before further use, the exact solid content of the solution is determined for example by means of a thermobalance and optionally adjusted to a value between 5% by wt. and 15% by wt. The determined or adjusted solid content serves as a basis for the further course of the procedure and in particular for determining the layer thickness to be applied to the substrate as well as for amount determination of the cross-linking reagents to be added. The pH value of the obtained polyvinyl alcohol solution is neutral.

After the cooling operation is terminated, the pH value of the freshly prepared polyvinyl alcohol solution is adjusted if needed. The adjustment of the pH value is effected in a manner known per se by addition of a suitable acid or base. For example, mineral acids such as concentrated hydrochloric acid or bases such as sodium hydroxide are suitable.

2. Production of an Aqueous Composition

2.1 Glyoxal as a Cross-Linking Agent

To the polyvinyl alcohol prepared according to item 1., a 40% glyoxal solution is added at room temperature (25° C.) with vigorous stirring within about 15 minutes with simultaneous adjustment of the pH value of the solution to pH=3 to obtain an aqueous composition for coating the substrate 12. The amount of the added glyoxal is between 5 and 40% by wt. related to 100% by wt. of polyvinyl alcohol.

After 15 minutes, the aqueous composition is degassed at an initial negative pressure of −200 mbar, which is slowly increased to −500 mbar to −600 mbar in the following. If the vacuum is further increased (e.g. to over −800 mbar, i.e. to a pressure of about 200 mbar), the water begins to boil and condensate deposits on the walls of the vacuum container. Finally, the aqueous composition is degassed at a pressure of about 100 mbar without further stirring.

After termination of the degassing, the aqueous composition can be applied to the substrate 12, wherein the polyvinyl alcohol is cross-linked by the glyoxal.

2.2 Adipic Acid (AS), Glutaric Acid (GS) and/or Maleic Acid (MS) as Cross-Linking Agents The addition of the mentioned dicarboxylic acids can be divided in two sub-categories:

The AS and GS belong to the group of the saturated dicarboxylic acids, wherein the AS is poorly soluble (24 g/l) and the GS is easily soluble (640 g/l) in cold water (20° C. The condensation reactions of both acids with polyvinyl alcohol are preferably catalytically supported by addition of mineral acids (e.g. hydrochloric acid) by adjusting the pH value of the aqueous composition to pH=3.

The MS is an unsaturated dicarboxylic acid, which is very well soluble in water (788 g/l, 20° C.) and reacts highly acidic in aqueous solution. The MS is present in cis form. By UV radiation and longer heating at 150° C., it converts to the trans form (fumaric acid), which optionally can be taken into account in the cross-linking reaction. In use of the MS, therefore, additional pH adjustment of the aqueous composition is usually not required. The pH value is between 1.6 and 3.2 according to the used amount, depending on the amount of MS dissolved in the aqueous polyvinyl alcohol solution. The added overall amount of dicarboxylic acid is basically between 5 and 25% by wt. related to 100% by wt. of polyvinyl alcohol.

The aqueous composition including polyvinyl alcohol and one or more of the mentioned dicarboxylic acids, is subsequently heated to 70° C., 15 minutes intensively stirred at 70° C., and then cooled to 25° C. Now, the pH value can be adjusted corresponding to the respectively employed dicarboxylic acid if needed. After pH value adjustment of the aqueous composition, preferably, the above described degassing step is effected.

2.3 Ferric Chloride ($FeCl_3$) as a Cross-Linking Agent

The addition of $FeCl_3$ to the polyvinyl alcohol solution is preferably effected at 25° C. with vigorous stirring. $FeCl_3$ can be present as a solid or already dissolved in water. The added amount of $FeCl_3$ is between 1 and 15% by wt. related to 100% by wt. of polyvinyl alcohol. The mixing time is 15 minutes at 25° C. A pH value adjustment is not required if further cross-linking agents are not provided. Before applying to the substrate 12 to be coated, here too, a degassing step is advisable.

2.4 Polyacrylates as a Cross-Linking Agent

Within the scope of the present invention, by polyacrylates, derivatives of the polyacrylic acid with the general formula

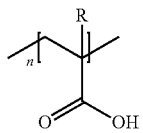

are understood, wherein R denotes hydrogen or unsubstituted or substituted alkyl group, in particular methyl, ethyl, 1-propyl, 2-propyl, 1-butyl, 2-butyl and/or tert-butyl. Preferably, polyacrylic acids in the molecular weight range of 2000 to 1500000 g/mol, in particular from 50000 to 500000 g/mol, are used, since this class is comparatively well soluble in cold water (20° C.). The added amount of polyacrylic acid is between 0.01 and 10% by wt. The mixing time is approximately 15 min. at 25° C. to 60° C. The pH value of the mixture can be increased if needed by addition of basic additives such as KOH, NaOH or the like. Before application, a degassing step is advisable.

2.5 Mixtures of Polyvinyl Alcohol with the Cross-Linking Agents Described Under 2.1 to 2.4

The above mentioned cross-linking agent can basically be arbitrarily mixed, e.g. $FeCl_3$ with di- and/or polycarboxylic acids and/or dialdehydes.

2.6 Incorporation of Fillers and/or Pigments

Fillers and/or pigments with preferably spherical and/or platelet-shaped particles are added to the aqueous composition in a weight percent range of 5-60% related to 100% by wt. of polyvinyl alcohol (PVOH). Basically, organic, inorganic and/or organic-inorganic modified particles equipped with or without swelling power in water are suitable as fillers and/or pigments.

Spherical particles such as silica particles with specific surfaces of 200-500 $g/m^2$ can be employed. The silica particles are present in solid form or in aqueous dispersions. The size of the particles is between 5 and 10 nm. Unmodified as well as (hydrophilic) modified particles can be employed. Particles are added in the range of 10-60% related to 100% by wt. of PVOH.

Alternatively, mixtures of spherical and platelet-shaped particles can be added. Platelet-shaped particles such as kaolins and sheet silicates (partially or completely anodized) can be employed unmodified or modified. Sheet silicates can be functionalized with alkoxy silanes, which carry amino, epoxy or mercapto groups. Besides kaolin, montmorillonite, bentonite, vermiculite, hectorite, saponite, laponite etc. or mixtures thereof can be employed. In employment of kaolin, a so-called "hyperplaty", nano-scaled type with a shape factor of at least 40 is used. A shape factor between 60 and 100 and a size of max. 1 μm are preferred.

Further fillers such as natural and/or synthetic aluminosilicates with defined pore volumes of 3-10 Å, 8-13 Å and 10-15 Å or more angstrom can be added alone or in combination with spherical or platelet-shaped fillers or added as mixtures from them.

Furthermore, natural organic fillers such as cellulose fibers and/or cellulose regenerate fibers, in particular micro- and nanofibrilled celluloses, can be used as fillers. These fillers can be used alone or in combination with one or more other fillers.

In a further development, it is provided that the aqueous composition is basically formed free of boron compounds such as for example borax, free of silicates swellable in water, in particular of swellable sheet silicates, and/or free of hydrogen sulfite adducts in order to ensure a high chemical and mechanical stability with high food compatibility of the resulting barrier layer 22 at the same time.

3. Application of the Aqueous Composition

An aqueous composition prepared according to the above described recipes is applied to the coated or preferably uncoated substrate 12. The base material 14 of the substrate 12 is composed of cardboard and has a surface weight between 200 $g/m^2$ and 800 $g/m^2$.

3.1 Application Possibilities and Layer Arrangement

3.1.1 One-Layer Wet Film Application

For producing a single barrier layer 22, the substrate 12 can be coated with aqueous compositions consisting of:
polyvinyl alcohol+glyoxal;
polyvinyl alcohol+dicarboxylic acids;
polyvinyl alcohol+polyacrylic acids;
polyvinyl alcohol+dicarboxylic acids+fillers and/or pigments;
polyvinyl alcohol+polyacrylic acids+dicarboxylic acids+fillers and/or pigments;
polyvinyl alcohol+$FeCl_3$; or
polyvinyl alcohol+mixture of different cross-linking agents;
polyvinyl alcohol+mixture of different cross-linking agents+fillers and/or pigments;
wherein the wet film application can be 3 to 15 $g/m^2$. Therein, it is to be emphasized that the substrate 12 alternatively can basically already consist of a base material 14 coated with non-cross-linked polyvinyl alcohol, wherein fillers and/or pigments can be admixed with the non-cross-linked polyvinyl alcohol if needed.

Further embodiments for the aqueous composition usable within the scope of the invention are indicated in table 1. Therein, it is again to be emphasized that the solid content of each aqueous composition is at most 25% by wt. inclusive possibly present fillers and/or pigments. Preferably, the solid content of each aqueous composition is at most 15% if the aqueous composition is formed free of fillers and/or pigments. The amounts of polyvinyl alcohol indicated in table 1 are always to be considered as 100 parts. The amount of the cross-linking agent is always related to the 100 parts of polyvinyl alcohol.

TABLE 1

| Ingredients of the aqueous composition | | | | | |
|---|---|---|---|---|---|
| Main component | | | Parts | Parts | Parts |
| PVOH | Degree of hydrolysis: 80->99% | ‑(CH₂‑CH(OH))ₙ‑ | 100 | 100 | 100 |
| Cross-linking agent/compound class | Chem. compound | Structural formula | Parts-min. number | Parts-max. number | Parts preferred |
| Dialdehydes unsaturated aldehydes | Glyoxal | (structure) | 1 | 50 | 10-30 |
| | Glutaraldehyde | (structure) | 1 | 50 | 5-25 |
| | Acrylaldehyde | (structure) | 1 | 50 | 5-20 |
| Polycarboxylic acids, unsaturated polycarboxylic acids, carboxylic acid esters | Malonic acid | (structure) | 1 | 50 | 10-30 |
| | Glutaric acid | (structure) | 1 | 50 | 10-30 |
| | Adipic acid | (structure) | 1 | 50 | 10-30 |
| | Citric acid | (structure) | 1 | 50 | 2-10 |
| | Butane tetracarboxylic acid anhydride | (structure) | 0.1 | 25 | 1-10 |
| | Acrylic acid | (structure) | 0.1 | 25 | 1-10 |
| | Methacrylic acid | (structure) | 0.1 | 25 | 1-10 |
| | Maleic acid | (structure) | 0.1 | 25 | 1-10 |

TABLE 1-continued

| | Ingredients of the aqueous composition | | | | |
|---|---|---|---|---|---|
| | Methacryl methyl ester | 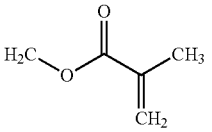 | 0.1 | 25 | 5-20 |
| | Hydroxyethyl methacrylate | 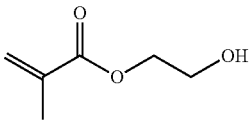 | 0.1 | 25 | 5-20 |
| FeCl₃ | FeCl₃ | | 0.1 | 20 | 1-10 |
| Silanes | TEOS | 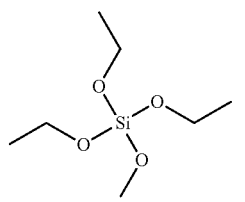 | 0.1 | 10 | 1-10 |
| Urea formaldehyde resin (e.g. Urecoll ®) | | | 0.1 | 20 | 1-10 |
| Polyacrylic acid | | 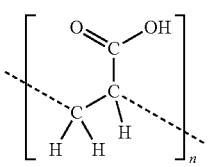 | 0.01 | 25 | 0.1-10 |

3.1.2 Multi-Layer Application

On demand, multi-layer layer systems 20 with two, three, four or five consecutively applied barrier layers 22 can be produced. An aqueous polyvinyl alcohol solution without cross-linking agent can also be used as a first conditioning streak or as a primer in this case. Alternatively or additionally, the non-cross-linked polyvinyl alcohol layer can be applied between two barrier layers 22 and/or as a terminating layer 24 as shown in FIG. 1. The non-cross-linked or cross-linked polyvinyl alcohol layer can be filled with fillers and/or pigments. The dry weight of each layer 24 and/or barrier layer 22 in turn can be 3 to 15 g/m².

3.2 Application Systems

The layer systems 20 described under 3.1.1. and 3.1.2. can be applied with application tools usual in the coating and paper industry by means of spraying, coating with doctor blade, casting or an equivalent contour coating method. Suitable parameter values are for example:
Rolling doctor blade: 10, 20, 40, 60, 80 μm wet film thickness
Film drawing frame: variable gap setting, 0-1000 μm wet film thickness
Film drawing frame: fixed gap: 60, 120 μm wet film thickness These application tools are employed by means of a motor-controlled application system with a maximum speed of the substrate 12 of up to 1000 m/min for uniform application.

Alternatively or additionally, a nozzle application system is used, which at the same time applies at least one barrier layer 22 or layer 24 and a maximum of four layers to the cardboard substrate 12 movable in horizontal direction. The mixing of the aqueous compositions can be effected in the nozzle chamber, in the nozzle gap (gap width e.g. 0.1-1.0 mm) or outside of the nozzle on the substrate 12. Wet film layer thicknesses above 200 μm are possible with this application method. From the parameters of "layer thickness" and "maximum speed" of the linear drive, the required delivery amount of the aqueous composition results.

4. Drying and Cross-Linking the Wet Films by Means of IR Radiation (IR), Convection Drying (KV) and/or UV Radiation (UV)

The solvent (water) of the aqueous composition applied to the substrate 12 is removed with infrared and/or convection driers. Both drier types can be used individually, collectively, successively or independently of each other. The drier temperatures of both dryer types can for example be chosen between 60° C. and 200° C. Supply and exhaust air, respectively, and temperature settings of the dryers or the dryer combination are preferably selected such that a bubble-free layer system 20 arises. A residual humidity of 5-7% by wt. in the substrate 12 can be taken as a criterion for the exact temperature setting.

All of the barrier layers 22 or layers 24 are preferably first dried with IR and/or KV. In aqueous compositions containing dialdehydes and/or dicarboxylic acids, polyacids and/or mixtures thereof as cross-linking agents (see 2.1 to 2.5), the thus supplied heat is sufficient to virtually quantitatively perform the cross-linking of the polyvinyl alcohol.

The cross-linking reaction with FeCl₃ is a two-step process. After the at least predominant removal of the solvent, the at least largely dry coating is irradiated with UV light. Hereto, for example, a Hg vapor high-pressure lamp can be used. The exposure of the UV active polyvinyl alcohol layer takes approximately 10 s at a power of about 0.4 W/cm² with an intensity specification of 75%.

Basically, it is advisable to irradiate all of the aqueous compositions containing UV active cross-linking agents with UV light before, during and/or after thermal drying.

5. Examination Method

5.1 Measurement of the Barrier Effect with Respect to Hydrophobic Hydrocarbons The packaging material 10 shown in FIG. 1 was subjected to a migration examination with the food stimulant Tenax® based on the test standards DIN EN 1186-13 and DIN EN 14338, wherein the Tenax® was applied to the layer system 20 of the packaging material 10. After incubation of the migration formulation at a defined temperature and time, the migrated substances were eluted from Tenax® by means of n-hexane and the mineral oil hydrocarbons were separated specifically in two different fractions by means of liquid chromatography, namely the fraction of the saturated (mineral oil saturated hydrocarbons, MOSH) and the fraction of the aromatic hydrocarbons (mineral oil aromatic hydrocarbons, MOAH). The two thus obtained fractions were analyzed by gas chromatography and acquired as a sum parameter, wherein deuterated n-nonadecane or diethyl naphthalene were employed for the evaluation of the signal area sums. With respect to the extractable starting amount of mineral oil hydrocarbons from the raw packaging material, which defines the sum of all of the components capable of migrating, less than 1% of the substances capable of migrating were detected in the Tenax® eluate. The migration of the hydrophobic hydrocarbons is therefore prevented more than 99% and therefore is always below a value of 0.6 mg/kg of packaged food for mineral oils.

5.2 Layer Structure

For characterizing the layer structure of the layer system 20, a semi-thin section was prepared, based on which the individual layers 22a, 22b and 24 were spectroscopically identified with an optical and an IR or Raman microscope.

6. Further Embodiments

In the following, further embodiments for the packaging material 10 according to the invention are specified. Unless otherwise stated, the production was effected in the above described manner.

6.1. Example 1

In the following, first, the production of a coated substrate 12 is explained:
Base material 14: Cardboard with an area-related mass between 200 and 800 g/m², preferably uncoated
Composition (not cross-linking) for coating:
    aqueous polyvinyl alcohol solution (Elvanol 90-50 or Elvanol 85-82, Dupont or mixtures thereof)
    solid content: 10.00% by wt.
Coating the cardboard base material 14 with the composition (40-200 µm wet film layer thickness)
Application method: doctor blade, airbrush, nozzle
Speed of the substrate 12: up to 1000 m/min
Drying: IR & convection until achieving 5-7% of residual humidity in the base material 14.

The thus produced substrate 12 can be used as a starting material for the application of one or more barrier layers 22.

6.2. Example 2

Base material 14: Cardboard with an area-related mass between 200 and 800 g/m², preferably uncoated
Aqueous composition (cross-linking):
    aqueous polyvinyl alcohol solution (Elvanol 90-50 or Elvanol 85-82, Dupont or mixtures thereof), pigments (according to item 2.5)
    as cross-linking agents, the cross-linking agents listed in item 3.1.1 or mixtures thereof are possible
    solid content: up to 25.00% by wt.
Coating the cardboard base material 14 with the aqueous composition (40-200 µm wet film layer thickness)
Application method: doctor blade, airbrush, nozzle
Speed of the substrate 12: up to 1000 m/min
Drying: IR & convection until achieving 5-7% of residual humidity in the base material 14.

6.3. Example 3

Base material 14: Cardboard with an area-related mass between 200 and 800 g/m², preferably uncoated
Composition (not cross-linking):
    aqueous polyvinyl alcohol solution (Elvanol 90-50 or Elvanol 85-82, Dupont or mixtures thereof) filled with pigments (cf. item 2.5)
    solid content: up to 25.00% by wt.
Coating the cardboard base material 14 or the substrate 12 with the composition (40-200 µm wet film layer thickness)
Application method: doctor blade, airbrush, nozzle
Speed of the substrate 12: up to 1000 m/min
Drying: IR & convection until achieving 5-7% of residual humidity in the base material 14.

6.4. Example 4

Base material 14: Cardboard with an area-related mass between 200 and 800 g/m², preferably uncoated
Composition (physically cross-linking):
    aqueous polyvinyl alcohol solution (Elvanol 90-50 or Elvanol 85-82, Dupont or mixtures thereof) filled with aluminosilicates and carboxymethyl cellulose
    solid content: 12% by wt.
Coating the cardboard base material 14 with the composition (40-200 µm wet film layer thickness)
Application method: nozzle, one-layer application
Speed of the base material: up to 1000 m/min
Drying: IR & convection until achieving 5-7% of residual humidity in the cardboard.

6.5. Example 5

Substrate 12: Cardboard with an area-related mass between 200 and 800 g/m², coated or preferably uncoated
Aqueous composition (thermally cross-linking or curing):
    aqueous PVOH solution, solid content 10% by wt. (Elvanol 85-82 or Elvanol 90-50 and mixtures thereof, Dupont), 100 parts
    maleic acid, p. a. (Sigma), 5 parts related to 100 parts of PVOH
Coating the substrate with the aqueous composition (1-layer application, 40-200 µm wet film layer thickness)

Application method: nozzle, one-layer application
Speed of the substrate 12: up to 1000 m/min
Drying: IR & convection until achieving 5-7% of residual humidity in the base material 14.

6.6. Example 6

Base material 14: Cardboard with an area-related mass between 200 and 800 g/m², coated or preferably uncoated
Aqueous composition (UV-curable):
   aqueous PVOH solution, solid content 10% by wt. (Elvanol 85-82 or Elvanol 90-50, and mixtures thereof, Dupont), 100 parts
   aqueous $FeCl_3$ solution (Donau Chemie), solid content 46.33% by wt., 6.7 parts related to 100 parts of PVOH
Coating the substrate with the aqueous composition (1-layer application, 40-200 μm wet film layer thickness)
Application method: nozzle, one-layer application
Speed of the base material: up to 1000 m/min
UV-curing with Hg vapor high-pressure lamp, 10 s exposure, 0.4 W/cm² power

6.7. Example 7

Base material 14: Cardboard with an area-related mass between 200 and 800 g/m², coated or preferably uncoated
Aqueous composition (thermally curing):
   aqueous PVOH solution, solid content 10% by wt. (PVOH-8582 or Elvanol 9050 and mixtures thereof, Dupont), 100 parts
   glyoxal (40% aqueous solution, BASF), 12.6 parts related to 100 parts of PVOH
Coating the substrate with the aqueous composition (1-layer application, 40-200 μm wet film layer thickness)
Application method: nozzle, one-layer application
Speed of the base material: up to 1000 m/min
Drying: IR & convection until achieving 5-7% of residual humidity in the cardboard base material 14.

6.8. Example 8

Base material 14: Paper with an area-related mass between 50 and 150 g/m², coated or preferably uncoated
Aqueous composition (thermally curing):
   aqueous PVOH solution, solid content 10% by wt. (PVOH-8582 or Elvanol 9050 or mixtures thereof, Dupont), 100 parts
   polyacrylic acid, 0.01-5.0 parts related to 100 parts of PVOH
Coating the substrate with the aqueous composition (1-layer application, 40-200 μm wet film layer thickness)
Application method: nozzle, one-layer application
Speed of the base material: up to 1000 m/min
Drying: IR & convection until achieving 5-7% of residual humidity in the base material 14.

6.9. Example 9

Base material 14: Cardboard with an area-related mass between 200 and 800 g/m², coated or preferably uncoated
Compositions: combination of example 1 and example 2, example 1 and example 3, example 1 and example 4, example 1 and example 5, example 1 and example 6, example 1 and example 7 or example 1 and example 8
The coating of example 1 is carried as the lowermost layer on the base material, the coating according to the recipe from example 2, 3, 4, 5, 6, 7 or 8 and/or two- or three-fold combinations of these examples are applied thereon.
Multi-layer application, each 80-200 μm wet film layer thickness
Speed of the base material: up to 1000 m/min
Application method: doctor blade, nozzle

6.10. Example 10

Base material: Cardboard with an area-related mass between 200 and 800 g/m², coated or preferably uncoated
Compositions:
combination of 2 streaks (aqueous compositions) from example 1 and one streak from example 2 to example 8. The streak from example 1 is used as a conditioning and covering streak in this application in order to act leveling on the inside 18 of the substrate 12 and protecting on the outside 16 of the substrate 12 with respect to tension and compression (forces, which occur in grooving and stamping operations). The covering streak is easily printable and bondable.
Multi-layer application, each 80-200 μm wet film layer thickness
Application method: doctor blade, nozzle
Speed of the base material: up to 1000 m/min
Drying: IR & convection until achieving 5-7% of residual humidity in the cardboard.

The parameter values specified in the documents for defining process and measurement conditions for the characterization of specific properties of the inventive subject matter are to be considered as encompassed by the scope of the invention even within the scope of deviations—for example due to measurement errors, system errors, weighing errors, DIN tolerances and the like.

The invention claimed is:
1. A method for producing a coated packaging material, comprising the steps of:
   a) providing a substrate having a base material of cellulose, an outside to face away from a packaging good as well as an inside to face the packaging good, wherein the base material is selected from the group consisting of: coated or uncoated paper, coated or uncoated cardboard, and coated or uncoated paperboard;
   b) coating the inside of the substrate with at least one layer of an aqueous composition including at least polyvinyl alcohol and a cross-linking agent and having a solid content of at most 25% by wt., wherein as the cross-linking agent at least an alkyl orthosilicate and/or at least one olefinically saturated and/or unsaturated bi-, tri- or multi-functional compound with at least two functional groups selected from carboxylic acid and acid anhydride is used; and adjusting a pH value of the aqueous composition to a value between 1 and 7 before applying the aqueous composition to the substrate;
   c) drying the layer and cross-linking the polyvinyl alcohol with the aid of the cross-linking agent with formation of a barrier layer for hydrophobic compounds; drying the substrate with the aqueous composition coated thereon to a residual humidity between 3% and 10% by weight in the base material; and
   wherein the cross-linking agent contributes to the formation of a three-dimensional network by reaction with polyvinyl alcohol.
2. The method according to claim 1, wherein the aqueous composition has a solid content between 3% by wt. and 25% by wt., and/or a water content of at least 75% by wt.
3. The method according to claim 1, wherein, as the cross-linking agent, tetraethyl orthosilicate, malonic acid, glutaric acid, adipic acid, citric acid, butane tetracarboxylic acid, maleic acid, polyacrylic acid, polymethacrylic acid, polyethyl acrylic acid or any mixtures hereof and/or polymerizates hereof and/or copolymerizates hereof is used.

4. The method according to claim 1, wherein the aqueous composition includes between 0.01 and 55 parts by weight of cross-linking agent related to 100 parts by weight of polyvinyl alcohol and/or between 1 and 60 parts by weight of a filler and/or a pigment related to 100 parts by weight of polyvinyl alcohol.

5. The method according to claim 4, wherein the filler and/or a pigment are acid-stable and/or have at least substantially spherical and/or platelet-shaped particle geometries.

6. The method according to claim 1, wherein the aqueous composition is applied to the substrate such that an area-related dry mass between 1 g/m² and 20 g/m² results and/or that the aqueous composition is applied to the substrate such that the layer has a wet film thickness between 1 μm and 1000 μm.

7. The method according to claim 1, wherein the aqueous composition is applied to the substrate by means of an equalizing coating method blade and/or film press, and/or by means of a contour coating method.

8. The method according to claim 1, wherein the coated substrate is dried by infrared irradiation and/or by convection and/or under UV irradiation in step c).

9. The method according to claim 1, wherein a substrate is provided in step a), which includes a base material, the outside and/or inside of which is provided with a conditioning layer and/or a covering layer.

10. The method according to claim 1, wherein the substrate is coated with a further composition before step a) and/or after step c), wherein the further composition includes at least polyvinyl alcohol, has a solid content of at most 15% by wt. and is free of cross-linking agents.

11. A method for producing a coated packaging material, comprising at least the steps of:
  a) providing a substrate having a base material of cellulose, an outside to face away from a packaging good as well as an inside to face the packaging good, wherein the base material is coated or uncoated paper, coated or uncoated cardboard or coated or uncoated paperboard;
  b) coating the inside of the substrate with at least one layer of aqueous compositions including at least polyvinyl alcohol and a cross-linking agent and having a solid content between 3% by wt. and 25% by wt.; and adjusting a pH value of the aqueous composition to a value between 1 and 7 before applying the aqueous compositions to the substrate;
  c) drying the layer and cross-linking the polyvinyl alcohol with the aid of the cross-linking agent with formation of a barrier layer for hydrophobic compounds, wherein the cross-linking agent contributes to the formation of a three-dimensional network by reaction with polyvinyl alcohol; drying the substrate coated with the aqueous compositions to a residual humidity between 3% and 10% by weight in the base material;
  wherein the steps b) and c) are repeated to form two barrier layers; the two barrier layers including polyvinyl alcohols with different cross-linking levels and/or polyvinyl alcohols with different degrees of hydrolysis and/or polyvinyl alcohols cross-linked with different cross-linking agents than each other; and/or
  wherein the substrate after step c) is coated with a further composition, wherein the further composition includes at least polyvinyl alcohol, has a solid content of between 1% by wt. and 15% by wt. and is free of cross-linking agents.

12. The method according to claim 11, wherein the at least one layer of aqueous compositions have a solid content between 3% by wt. and 25% by wt., and/or a water content of at least 75% by wt.

13. The method according to claim 11, wherein, as the cross-linking agent, at least one olefinically saturated and/or unsaturated compound with at least one functional group selected from aldehyde, carboxylic acid, acid anhydride and amino group, and/or ferric chloride and/or an alkyl orthosilicate, in particular tetraethyl orthosilicate, and/or a urea formaldehyde resin is used.

14. The method according to claim 11, wherein the at least one layer of aqueous compositions include between 0.01 and 55 parts by weight of cross-linking agent related to 100 parts by weight of polyvinyl alcohol and/or between 1 and 60 parts by weight of a filler and/or a pigment related to 100 parts by weight of polyvinyl alcohol.

15. The method according to claim 14, wherein the filler and/or the pigment are acid-stable and/or have at least substantially spherical and/or platelet-shaped particle geometries.

16. The method according to claim 11, wherein the at least one layer of aqueous compositions are applied to the substrate such that an area-related dry mass between 1 g/m² and 20 g/m² results and/or that the at least one layer of aqueous compositions are applied to the substrate such that the layer has a wet film thickness between 1 μm and 1000 μm.

17. The method according to claim 11, wherein the at least one layer of aqueous compositions are applied to the substrate (12) by means of an equalizing coating method, and/or by means of a contour coating method.

18. The method according to claim 11, wherein the coated substrate is dried by infrared irradiation and/or by convection and/or under UV irradiation in step c).

19. The method according to claim 11, wherein a substrate is provided in step a), which includes a base material (14), the outside and/or inside of which is provided with a conditioning layer and/or a covering layer.

* * * * *